United States Patent [19]

Higgins

[11] 4,161,566
[45] Jul. 17, 1979

[54] AQUEOUS DISPERSE COMPOSITIONS CONTAINING CLAY AND OLEAGINOUS FILM-FORMING MATERIALS

[75] Inventor: William A. Higgins, Gates Mills, Ohio

[73] Assignee: The Lubrizol Corporation, Wickliffe, Ohio

[21] Appl. No.: 918,008

[22] Filed: Jun. 22, 1978

Related U.S. Application Data

[63] Continuation-in-part of Ser. No. 846,062, Oct. 27, 1977, abandoned.

[51] Int. Cl.$^2$ .................... C23F 11/16; C10M 7/38; C10M 7/46
[52] U.S. Cl. ................... 428/454; 106/14.12; 106/14.13; 106/14.28; 106/14.29; 252/32.7 R; 252/33; 252/389 A; 422/7; 427/388 C; 428/457; 428/470
[58] Field of Search ............... 252/389 A, 32.7 R, 33; 422/7; 106/14.12, 14.13, 14.28, 14.29; 427/388 C; 428/454, 457, 470

[56] References Cited

U.S. PATENT DOCUMENTS

| | | | |
|---|---|---|---|
| 3,337,283 | 4/1968 | McMillan | 106/14.29 |
| 3,384,586 | 5/1968 | McMillen | 252/33 |
| 3,422,013 | 1/1969 | Schor | 106/14.29 |
| 3,453,124 | 7/1969 | Wurstner | 106/14.29 |
| 3,492,231 | 1/1970 | McMillen | 252/33 |
| 3,763,042 | 10/1973 | Gannon et al. | 252/389 |

*Primary Examiner*—Benjamin R. Padgett
*Assistant Examiner*—Irwin Gluck
*Attorney, Agent, or Firm*—James W. Adams, Jr.; Daniel N. Hall

[57] ABSTRACT

Aqueous disperse compositions capable of irreversibly forming films, comprising an internal phase of at least one film-forming, non-asphaltic, oleaginous material and an external phase comprising a clay-thickened water slurry, containing, in addition to clay, a flocculating agent are disclosed. Typical film-forming materials are made by reacting a carboxylic acid with an overbased salt of an organic acid, particularly those that have been converted into non-Newtonian colloidal disperse systems such as an alkaline earth metal sulfonate gel. Typical clays are montmorillonite-type clays and usually the composition as a whole is thixotropic. These compositions are useful, for example, as coatings for preventing corrosion of metallic surfaces.

54 Claims, No Drawings

AQUEOUS DISPERSE COMPOSITIONS CONTAINING CLAY AND OLEAGINOUS FILM-FORMING MATERIALS

REFERENCE TO RELATED APPLICATIONS:

This application is a continuation-in-part of copending U.S. application Ser. No. 846,062, filed Oct. 27, 1977, now abandoned.

Field of the Invention

This invention relates to aqueous disperse compositions capable of irreversibly forming coherent films. More particularly, it relates to compositions comprising as an internal phase at least one film-forming, non-asphaltic, oleaginous material and an external phase comprising a clay thickened water slurry wherein the slurry also contains at least one flocculating agent. Processes for making such compositions, coherent films produced from them and articles of manufacture wherein metallic surface is at least partially coated with such films are part of the invention. Methods of inhibiting corrosion of metal surfaces using these compositions are also within the scope of the invention.

Prior Art

Both oil-based and water-based clay-thickened compositions are known. See, for example, U.S. Pat. Nos. 3,763,042; 3,449,248; 3,250,735; and 3,247,011.

Overbased non-Newtonian colloidal disperse systems are also known. See, for example, U.S. Pat. Nos. 3,384,586; 3,242,079; 3,372,114; 3,372,115; 3,376,222; 3,377,283; 3,422,013; and 3,492,231, which are hereby incorporated by reference for their disclosures relating to such non-Newtonian systems.

Other U.S. patents describing such non-Newtonian systems include the following: U.S. Pat. Nos. 3,746,643; 3,816,310; 3,746,643; and 3,671,012.

Clay-thickened, aqueous asphalt emulsions are known to the art. See, for example, U.S. Pat. Nos. 3,095,339; 2,652,341; and 1,398,201. Asphalt emulsions containing sulfonic acid salts are also known. See U.S. Pat. No. 2,503,246.

Objects

It is an object of this invention to provide aqueous disperse compositions capable or irreversibly forming coherent films.

It is also an object of this invention to provide methods of making such aqueous disperse compositions.

A further object of this invention is to provide coherent films made by removal of a substantial proportion of water from these aqueous disperse compositions.

It is also an object of this invention to provide methods for inhibiting corrosion of metal surfaces by applying such disperse compositions to a metal surface and removing a substantial proportion of water to form a coating or film.

Other objects of the invention will be apparent to those skilled in the art upon study of this specification.

BRIEF DESCRIPTION OF THE INVENTION

The aqueous disperse compositions of this invention are capable of irreversibly forming a coherent film, for example, on a metal surface and comprise (I) an internal pahse of at least one film-forming, non-asphaltic, oleaginous material (A) and (II) an external phase comprising a clay-thickened water slurry (B-1), said slurry containing in addition to water and at least one clay (B-2), at least one flocculating agent (C). The slurry in these aqueous disperse compositions exhibit a pH in the range of about 6 to about 9. Methods for preparing such aqueous disperse compositions as well as films formed by the removal of a substantial proportion of water from the composition are also within the scope of the invention, as are articles of manufacture having at least one metal surface of which at least a portion is covered by such films and methods of inhibiting corrosion of metallic surfaces by the use of such compositions.

The term "coherent" is used herein to indicate that films formed by the practice of this invention hold together firmly with stickiness and resist separation including separation from the substrate they may cover. As those skilled in the art are aware, such coherent films are particularly useful in many applications such as coating metal surfaces to inhibit corrosion and/or wear.

The terms "external" and "internal" phases are used herein in their art-recognized sense to signify the discontinuous and continuous phases, respectively, of an emulsion.

The film-forming, non-asphaltic, oleaginous materials (A) used in this invention typically comprise carboxylate salts and oil solutions/dispersions of such carboxylate salts. Organic resins with acid functionality which is capable of reacting with carbonates and bicarbonates to form carbon dioxide can also be used. Such functional groups as sulfonic, phosphoric, sulfuric, and boric acid groups are of this type. The fact that these materials are non-asphaltic in nature makes them preferable to asphaltic materials because of environmental and other concerns. Typical carboxylate salts are made by reacting (D) at least one carboxylic acid, or reactive equivalent thereof such as an anhydride, with (E) at least one overbased salt of an organic acid, usually one that has been converted into a non-Newtonian colloidal disperse system. The carboxylic acid (D) can be formed by oxidation of petroleum fractions such as petroleum wax fractions. Carboxylic acids of the general formula

$$R(COOH)_x \qquad \text{Formula (I)}$$

wherein R is a substantially hydrocarbyl group of about 12 to about 300 carbon atoms derived from polymerization of at least one $C_{2-8}$ olefin and x is 1, 2 or 3 can also be used as can mixtures of such acids with the aforementioned oxidized waxes. The acids of Formula I can be made by reacting an olefin (e.g., a polyalkylene such as polybutene, polypropylene, etc.) or derivative thereof (e.g., a halogenated derivative) with a lower molecular weight unsaturated carboxylic acid or derivative thereof. Typical such unsaturated carboxylic acids (and derivatives) include acylic acid, methacrylic acid, maleic acid, maleic anhydride, fumaric acid, and the like. Many patents describe the production of the acids of Formula I including, for example, the following United States, British and Canadian patents: U.S. Pat. Nos. 3,024,237; 3,087,936; 3,172,892; 3,215,707; 3,219,666; 3,231,587; 3,245,910; 3,272,746; 3,288,714; 3,312,619; 3,341,542; 3,367,943; 3,381,022; 3,454,607; 3,470,098; 3,630,902; 3,652,616; 3,755,169; 3,868,330; 3,912,764; U.K. Pat. Nos. 944,136; 1,085,903; 1,162,436; 1,440,219; and Canadian Pat. No. 956,397. These patents are hereby incorporated by reference for their disclosures relating to methods for the preparation of the aforedescribed carboxylic acids.

More typically, for reasons of economy and availability, the carboxylic acid (D) used in making the film-forming materials used in the present invention is made by oxidation of a petroleum wax fraction. While various kinds of wax, such as paraffinic, microcrystalline, and slack waxes can be used, a particularly suitable wax has been found to be petrolatum.

Oxidation of these materials can be accomplished by many techniques known to those of skill in the art. Usually such oxidations are carried out by blowing air through the wax in the presence of a metal catalyst such as a copper, cobalt or manganese salt. Further details concerning wax oxidations can be found in "Chemistry of Petroleum Derivatives" by Karelton Ellis, particularly pages 962–979, Rhinehold Publishing Corporation, New York (1937).

A particularly suitable oxidized petrolatum for use in making the film-forming oleaginous materials (A) used in the present invention is available from the Ashland Oil Company under the name of Tectyl 3050. Other available oxidized petrolatum fractions are available from the petroleum industry and can be used alone or in admixture with the aforementioned Tectyl 3050.

The film-forming, non-asphaltic oleaginous material (A) used in making the disperse compositions of this invention are typically made by reacting at least one of the aforedescribed carboxylic acids (D) with at least one overbased salt of an organic acid (E); obviously, mixtures of overbased salts (E) can be used.

These overbased salts of organic acids are widely known to those of skill in the art and generally include metal salts wherein the amount of metal present in them exceeds the stoichiometric amount. Such salts are said to have conversion levels in excess of 100% (i.e., they comprise more than 100% of the theoretical amount of metal needed to convert the acid to its "normal", "neutral" salt). Such salts are often said to have metal ratios in excess of one (i.e., the ratio of equivalents of metal to equivalents of organic acid present in the salt is greater than that required to provide the normal or neutral salt which requires only a stoichiometric ratio of 1:1). They are commonly referred to as overbased, hyperbased or superbased salts and are usually salts of organic sulfur acids, organic phosphorus acids, carboxylic acids, phenols or mixtures of two or more of any of these. As a skilled worker would realize, mixtures of such overbased salts can also be used.

The terminology "metal ratio" is used in the prior art and herein to designate the ratio of the total chemical equivalents of the metal in the overbased salt to the chemical equivalents of the metal in the salt which would be expected to result in the reaction between the organic acid to be overbased and the basically reacting metal compound according to the known chemical reactivity and stoichiometry of the two reactants. Thus, in a normal or neutral salt the metal ratio is one and in an overbased salt the metal ratio is greater than one.

The overbased salts used as (E) in this invention usually have metal ratios of at least about 3:1. Typically, they have ratios of at least about 12:1. Usually they have metal ratios not exceeding about 40:1. Typically salts having ratios of about 12:1 to about 20:1 are used.

The basically reacting metal compounds used to make these overbased salts are usually an alkali or alkaline earth metal compound (i.e., the Group IA, IIA, and IIB metals excluding francium and radium and typically excluding rubidium, cesium, and beryllium) although other basically reacting metal compounds can be used. Basically reacting compounds of Ca, Ba, Mg, Na, and Li, such as their hydroxides and alkoxides of lower alkanols are usually used as the basically reacting metal compounds in preparing these overbased salts but others can be used as shown by the prior art incorporated by reference herein. Overbased salts containing a mixture of ions of two or more of these metals can be used in the present invention.

These overbased salts can be of oil-soluble organic sulfur acids such as sulfonic, sulfamic, thiosulfonic, sulfinic, sulfenic, partial ester sulfuric, sulfurous and thiosulfuric acid. Generally they are salts of carbocyclic or aliphatic sulfonic acids.

The carbocyclic sulfonic acids include the mono- or poly-nuclear aromatic or cycloaliphatic compounds. The oil-soluble sulfonates can be represented for the most part by the following formulae:

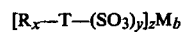  Formula II

  Formula III

In the above formulae, M is either a metal cation as described hereinabove or hydrogen; T is a cyclic nucleus such as, for example, benzene, naphthalene, anthracene, phenanthrene, diphenylene oxide, thianthrene, phenothioxine, diphenylene sulfide, phenothiazine, diphenyl oxide, diphenyl sulfide, diphenylamine, cyclohexane, petroleum naphthenes, decahydro-naphthalene, cyclopentane, etc.; R in Formula II is an aliphatic group such as alkyl, alkenyl, alkoxy, alkoxyalkyl, carboalkoxyalkyl, etc.; x is at least 1, and $R_x$ + T contains a total of at least about 15 carbon atoms. R' in Formula III is an aliphatic radical containing at least about 15 carbon atoms and M is either a metal cation or hydrogen. Examples of types of the R' radical are alkyl, alkenyl, alkoxyalkyl, carboalkoxyalkyl, etc. Specific examples of R' are groups derived from petrolatum, saturated and unsaturated paraffin wax, and polyolefins, including polymerized $C_2$, $C_3$, $C_4$, $C_5$, $C_6$, etc., olefins containing from about 15 to 7000 or more carbon atoms. The groups T, R, and R' in the above formulae can also contain other inorganic or organic substituents in addition to those enumerated above such as, for example, hydroxy, mercapto, halogen, nitro, amino, nitroso, sulfide, disulfide, etc. In Formula II, x, y, z and b are at least 1, and likewise in Formula III, a, b and d are at least 1.

Specific examples of sulfonic acids useful in this invention are mahogany sulfonic acids; bright stock sulfonic acids; sulfonic acids derrived from lubricating oil fractions having a Saybolt viscosity from about 100 seconds at 100° F. to about 200 seconds at 210° F.; petrolatum sulfonic acids; mono- and poly-wax substituted sulfonic and polysulfonic acids of, e.g., benzene, naphthalene, phenol, diphenyl ether, napthalene disulfide, diphenylamine, thiophene, alpha-chloronaphthalene, etc.; other substituted sulfonic acids such as alkyl benzene sulfonic acids (where the alkyl group has at least 8 carbons), cetylphenol mono-sulfide sulfonic aicds, dicetyl thianthrene disulfonic acids, dilauryl beta naphthyl sulfonic acid, dicapryl nitronaphthalene sulfonic acids, and alkaryl sulfonic acids such as dodecyl benzene "bottoms" sulfonic acids.

The latter are acids derived from benzene which has been alkylated with propylene tetramers or isobutene trimers to introduce 1, 2, 3, or more branched-chain $C_{12}$ substituents on the benzene ring. Dodecyl benzene bottoms, principally mixtures of mono- and di-dodecyl benzenes, are available as by-products from the manufacture of household detergents. Similar products obtained from alkylation bottoms formed during manufacture of linear alkyl sulfonates (LAS) are also useful in making the sulfonates used in this invention.

The production of sulfonates from detergent manufacture by-products by reaction with, e.g. $SO_3$, is well known to those skilled in the art. See, for example, the article "Sulfonates" in Kirk-Othmer "Encyclopedia of Chemical Technology", Second Edition, Vol. 19, pp. 291 et seq. published by John Wiley & Sons, N.Y. (1969).

Other descriptions of overbased sulfonate salts and techniques for making them can be found in the following U.S. Pat. Nos. 2,174,110; 2,174,506; 2,174,508; 2,193,824; 2,197,800; 2,202,781; 2,212,786; 2,213,360; 2,228,598; 2,223,676; 2,239,974; 2,263,312; 2,276,090; 2,276,097; 2,315,514; 2,319,121; 2,321,022; 2,333,568; 2,333,788; 2,335,259; 2,337,552; 2,346,568; 2,366,027; 2,374,193; 2,383,319; 3,312,618; 3,471,403; 3,488,284; 3,595,790; and 3,798,012. These are hereby incorporated by reference for their disclosures in this regard.

Also included are aliphatic sulfonic acids such as paraffin wax sulfonic acids, unsaturated paraffin wax sulfonic acids, hydroxy-substituted paraffin wax sulfonic acids, hexapropylene sulfonic acids, tetra-amylene sulfonic acids, polyisobutene sulfonic acids wherein the polyisobutene contains from 20 to 7000 or more carbon atoms, chloro-substituted paraffin wax sulfonic acids, nitroparaffin wax sulfonic acids, etc.; cycloaliphatic sulfonic acids such as petroleum naphthene sulfonic acids, cetyl cyclopentyl sulfonic acids, lauryl cyclohexyl sulfonic acids, bis-(di-isobutyl) cyclohexyl sulfonic acids, etc.

With respect to the sulfonic acids or salts thereof described herein and in the appended claims, it is intended that the term "petroleum sulfonic acids" or "petroleum sulfonates" includes all sulfonic acids or the salts thereof derived from petroleum products. A particularly valuable group of petroleum sulfonic acids are the mahogany sulfonic acids (so called because of their reddish-brown color) obtained as a by-product from the manufacture of petroleum white oils by a sulfuric acid process.

Generally Group IA, IIA and IIB overbased salts of the above-described synthetic and petroleum sulfonic acids are typically useful in making the film-forming materials (A) of this invention.

The carboxylic acids from which suitable overbased salts for use in this invention can be made include aliphatic, cycloaliphatic, and aromatic mono- and polybasic carboxylic acids such as the napthenic acids, alkyl- or alkenyl-substituted cyclopentanoic acids, alkyl- or alkenylsubstituted cyclohexanoic acids, alkyl- or alkenyl-substituted aromatic carboxylic acids. The aliphatic acids generally contain at least eight carbon atoms and preferably at least twelve carbon atoms. Usually they have no more than about 400 carbon atoms. Generally, if the aliphatic carbon chain is branched, the acids are more oil-soluble for any given carbon atoms content. The cycloaliphatic and aliphatic carboxylic acids can be saturated or unsaturated. Specific examples include 2-ethylhexanoic acid, α-linolenic acid, propylene-tetramer-substituted maleic acid, behenic acid, isostearic acid, pelargonic acid, capric acid, palmitoleic acid, linoleic acid, lauric acid, oleic acid, ricinoleic acid, undecylic acid, dioctylcyclopentane carboxylic acid, myristic acid, dilauryldecahydronaphthalene carboxylic acid, stearyl-octahydroindene carboxylic acid, palmitic acid, commercially available mixtures of two or more carboxylic acids such as tall oil acids, rosein acids, and the like.

A typical group of oil-soluble carboxylic acids useful in preparing the salts used in the present invention are the oil-soluble aromatic carboxlic acids. These acids are represented by the general formula:

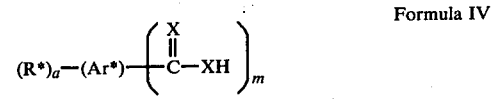

Formula IV wherein R* is an aliphatic hydrocarbon-based group of at least four carbon atoms, and no more than about 400 aliphatic carbon atoms, a is an integer from one to four, Ar* is a polyvalent aromatic hydrocarbon nucleus of up to about 14 carbon atoms, each X is independently a sulfur or oxygen atom, and m is an integer of from one to four with the proviso that R* and a are such that there is an average of at least 8 aliphatic carbon atoms provided by the R* groups for each acid molecule represented by Formula IV. Examples of aromatic nuclei represented by the variable Ar* are the polyvalent aromatic radicals derived from benzene, napthalene anthracene, phenanthrene, indene, fluorene, biphenyl, and the like. Generally, the radical represented by Ar* will be a polyvalent nucleus derived from benzene or naphthalene such as phenylenes and naphthylene, e.g., methylphenylenes, ethoxyphenylenes, nitrophenylenes, isopropylphenylenes, hydroxyphenylenes, mercaptophenylenes, N,N-diethylaminophenylenes, chlorophenylenes, dipropoxynaphthylenes, triethylnaphthylenes, and similar tri-, tetra-, pentavalent nuclei thereof, etc.

The R* groups are usually purely hydrocarbyl groups, preferably groups such as alkyl or alkenyl radicals. However, the R* groups can contain small number substituents such as phenyl, cycloalkyl (e.g., cyclohexyl, cyclopentyl, etc.) and nonhydrocarbon groups such as nitro, amino, halo (e.g., chloro, bromo, etc.), lower alkoxy, lower alkyl mercapto, oxo substituents (i.e., =O), thio groups (i.e., =S), interrupting groups such as —NH—, —O—, —S—, and the like provided the essentially hydrocarbon character of the R* group is retained. The hydrocarbon character is retained for purposes of this invention so long as any non-carbon atoms present in the R* groups do not account for more than about 10% of the total weight of the R* groups.

Examples of R* groups include butyl, isobutyl, pentyl, octyl, nonyl, dodecyl, docosyl, tetracontyl, 5-chlorohexyl, 4-ethoxypentyl, 4-hexenyl, 3-cyclohexyloctyl, 4-(p-chlorophenyl)-octyl, 2,3,5-trimethylheptyl, 4-ethyl-5-methylocytyl, and substitutents derived from polymerized olefins such as polychloroprenes, polyethylenes, polypropylenes, polyisobutylenes, ethylene-propylene copolymers, chlorinated olefin polymers, oxidized ethylene-propylene copolymers, and the like. Likewise, the group Ar* may contan non-hydrocarbon substituents, for example, such diverse substituents as lower alkoxy, lower alkyl mercapto, nitro, halo, alkyl or alkenyl groups of less than four carbon atoms, hydroxy, mercapto, and the like.

Another group of useful carboxylic acids are those of the formula:

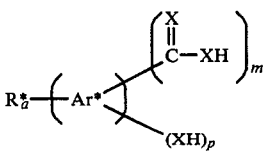

Formula V wherein R*, X, Ar*, m and a are as defined in Formula IV and p is an integer of 1 to 4, usually 1 or 2. Within this group, an especially preferred class of oil-soluble carboxylic acids are those of the formula:

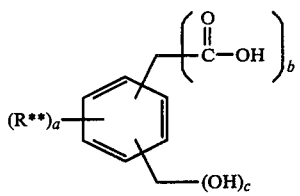

Formula VI wherein R in Formula VI is an aliphatic hydrocarbon group containing at least 4 to about 400 carbon atoms, a is an integer of from 1 to 3, b is 1 or 2, c is zero, 1, or 2 and preferably 1 with the proviso that R and a are such that the acid molecules contain at least an average of about twelve aliphatic carbon atoms in the aliphatic hydrocarbon substituents per acid molecule. And within this latter group of oil-soluble carboxylic acids, the aliphatic-hydrocarbon substituted salicyclic acids wherein each aliphatic hydrocarbon substituent contains an average of at least about sixteen carbon atoms per substituent and one to three substituents per molecule are particularly useful. Salts prepared from such salicyclic acids wherein the aliphatic hydrocarbon substituents are derived from polymerized olefins, particularly polymerized lower 1-mono-olefins such as polyethylene, polypropylene, polyisobutylene, ethylene/propylene copolymers and the like and having average carbon contents of about 30 to about 400 carbon atoms.

The carboxylic acids corresponding to Formulae IV-V above are well known or can be prepared according to procedures known in the art. Carboxylic acids of the type illustrated by the above formulae and processes for preparing their overbased metal salts are well known and disclosed, for example, in such U.S. Pat. Nos. as 2,197,832; 2,197,835; 2,252,662; 2,252,664; 2,714,092; 3,410,798 and 3,595,791 which are incorporated by reference herein for their disclosures of acids and methods of preparing overbased salts.

Another type of overbased carboxylate salt used in making the film-forming materials (A) of this invention are those derived from alkenyl succinates of the general formula

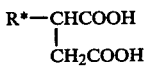   Formula VII

Wherein R* is as defined above in Formula IV. Such salts and means for making them are set forth in U.S. Pat. Nos. 3,271,130, 3,567,637 and 3,632,510, which are hereby incorporated by reference in this regard.

Other patents specifically describing techniques for making overbased salts of the hereinabove-described sulfonic acids, carboxylic acids, and mixtures of any two or more of these include U.S. Pat. Nos. 2,501,731; 2,616,904; 2,616,905; 2,616,906; 2,616,911; 2,616,924; 2,616,925; 2,617,049; 2,777,874; 3,027,325; 3,256,186; 3,282,835; 3,384,585; 3,373,108; 3,365,396; 3,342,733; 3,320,162; 3,312,618; 3,318,809; 3,471,403; 3,488,284; 3,595,790; and 3,629,109. The disclosures of these patents are hereby incorporated in this present specification for their disclosures in this regard as well as for their disclosure of specific suitable basic metal salts.

In the context of this invention, phenols are considered organic acids. Thus, overbased salts of phenols (generaly known as phenates) are also useful in making the film-forming materials (A) of this invention and well known to those skilled in the art. The phenols from which these phenates are formed are of the general formula

   Formula VIII wherein R*, n, Ar*, X and m have the same meaning and preferences are described hereinabove with reference to Formula IV. The same examples described with respect to Formula IV also apply.

A commonly available class of phenates are those made from phenols of the general formula

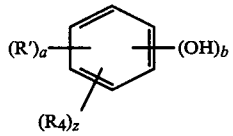   Formula IX wherein a is an integer of 1-3, b is of 1 or 2, z is 0 or 1, R' in Formula IX is a substantially saturated hydrocarbonbased substituent having an average of from 30 to about 400 aliphatic carbon atoms and R$_4$ is selected from the group consisting of lower alkyl, lower alkoxyl, nitro, and halo groups.

One particular class of phenates for use in this invention are the overbased, Group IIA metal sulfurized phenates made by sulfurizing a phenol as described hereinabove with a sulfurizing agent such as sulfur, a sulfur halide, or sulfide or hydrosulfide salt. Techniques for making these sulfurized phenates are described in U.S. Pat. Nos. 2,680,096; 3,036,971; and 3,775,321 which are hereby incorporated by reference for their disclosures in this regard.

Other phenates that are useful are those that are made from phhenols that have been linked through alkylene (e.g., methylene) bridges. These are made by reacting single or multi-ring phenols with aldehydes or ketones, typically, in the presence of an acid or basic catalyst. Such linked phenates as well as sulfurized phenates are described in detail in U.S. Pat. No. 3,350,038; particularly columns 6-8 thereof, which is hereby incorporated by reference for its disclosures in this regard.

Suitable acids include oil-soluble organic acids such as phosphorus organic acids, thiophosphorus acids, and the like, as well as the corresponding alkali and alkaline earth metal salts thereof. U.S. Pat. Nos. 2,606,904; 2,695,910; 2,767,164; 2,767,209; 2,777,874; 3,147,232; and 3,274,135 disclose a variety of overbased products which can be prepared from diverse organic acid starting materials and are incorporated by reference herein for such disclosures. Overbased acids wherein the acid is a phosphorus acid, a thiophosphorus acid, phosphorus acid-sulfur acid combination, or sulfur acid prepared from polyolefins are disclosed in U.S. Pat. Nos. 2,883,340; 2,915,517; 3,001,981; 3,108,960; and 3,232,883. These latter patents are incorporated by reference herein for such disclosure.

Naturally, mixtures of two or more overbased salts of the hereinabove described organic sulfur acid, phosphorus acid, carboxylic acids and phenols can be used in the compositions of this invention. Usually the overbased salts and any neutral salts used in their preparation will be sodium, lithium, magnesium, calcium, or barium salts including mixtures of two or more of any of these overbased or neutral salts.

A particularly useful type of overbased salt of an organic acid useful in making the film-forming materials (A) of the present invention are the "gelled" overbased salts known to the art as non-Newtonian colloidal disperse systems. These overbased systems comprise:

1. solid, metal-containing colloidal particles pre-dispersed in at least one diluent and characterized by an average unit particle size of at least 20 A. and up to about 5,000 A., said particles having been formed in situ in said non-Newtonian colloidal system from metal-containing materials homogeneously dispersed in a single-phase Newtonian overbased material, characterized by a metal ratio of at least 1.1;

2. as an essential third component, at least one organic compound which is soluble in the dispersing medium (2), the molecules of said organic compound being characterized by a hydrophobic portion and at least one polar substituent.

These non-Newtonian colloidal disperse systems and their component parts (e.g., diluent, dispersing medium, and organic compounds) are described, for example, in the following U.S. Pat. Nos.: 3,492,231; 3,242,079; 3,027,325; 3,488,284; 3,372,114; 3,411,923; 3,372,115; 3,422,013; 3,350,308; 3,312,618; 3,376,222; 3,471,403; 3,453,124; 3,377,283; 3,595,790; 3,766,067; 3,766,066; 3,671,012; and 3,384,586. These patents are incorporated by reference for their disclosures relating to the nature and methods of preparing overbased non-Newtonian colloidal disperse systems (E) useful in making the film-forming materials (A) of the present invention.

In these non-Newtonian systems at least a portion of the particles dispersed therein are solid metal-containing particles formed in situ. The size of these particles is not critical as long as they are dispersed in the form, for example, of colloids or colloidal solutions. Ordinarily, the particles do not exceed 5000 angstroms in size. Generally, the maximum unit particle size is less than about 1000 angstroms, usually less than 400 angstroms. Disperse systems having unit particle size in the range of 30 angstroms to 200 angstroms has been found to give excellent results. The term "unit particle size" is defined in the above-noted '586 patent which is incorporated herein by reference for this definition.

The solid metal-containing particles are metal salts of inorganic acids and low molecular weight organic acids (such as carbonic, acetic and propionic acids), hydrates thereof, or mixtures of two or more of these. These salts are usually alkali and alkaline earth formates, acetates, carbonates, hydrogen carbonates, hydrogen sulfides, sulfides, sulfates, hydrogen sulfates and halides. Magnesium, calcium and barium salts are typical examples. Typically then the metal particles are solid metal-containing colloidal particles consisting essentially of alkaline earth metal salts, these salts being further characterized by having been formed in situ.

Colloidal disperse systems used in the agents of this invention also comprise at least about one liquid dispersing medium. The identity of the medium is not a critical aspect of the invention as the medium serves primarily as a liquid vehicle in which the solid particles are dispersed. Normally it consists of one or more substantially inert, nonpolar oleaginous liquids. These liquids are thus substantially chemically inactive in the particular environment in question. In other words, they do not interact chemically with the other components of their environment in such a way as to substantially alter their chemical nature. The liquid dispersing medium may be substantially volatile or non-volatile at standard temperature and pressure. Often the non-Newtonian disperse system is prepared in such a manner that a mixture of such volatile and nonvolatile organic liquids is used as the dispersing medium thus permitting easy removal of all or a portion of the volatile component by heating. This is an optional and often desirable means for controlling the viscosity or fluidity of the disperse system.

Typical dispersing media are disclosed in U.S. Pat. No. 3,384,586 which is incorporated by reference for its disclosures in this regard. These media include liquids such as mineral oils and synthetic oils as well as other organic liquids such as ethers, alkanols, alkylene glycols, ketones, and the like.

From the standpoint of availability, cost and performance, liquid hydrocarbons and particularly liquid petroleum fractions represent particularly useful dispersing media. Included within these classes are alkylated benzenes, and naphthene-based petroleum fractions, paraffin-based petroleum fractions, petroleum ether, petroleum naphthas, mineral oil, Stoddard Solvent, and mixtures thereof. Typically, the dispersing medium is mineral oil or at least about 25% of the total medium is mineral oil. Often at least about 50% of the dispersing medium is mineral oil. As noted, mineral oil can serve as the exclusive dispersing medium or it can be combined with some non-mineral oil organic liquid such as, for example, the fluidizers described infra.

Preferably, (E) the overbased non-Newtonian system is derived from one or more alkali metal, alkaline earth metal or alkali/alkaline earth mixed metal overbased salts of at least one organic sulfonic acid, carboxylic acid or mixtures of same. Especially preferred are non-Newtonian overbased calcium sulfonates of alkyl benzene sulfonic acid such as disclosed in U.S. Pat. No. 3,492,231, which is hereby expressly incorporated by reference for its disclosures of such sulfonate.

The clays (B-2) useful in the compositions of the present invention are those which are capable of thickening aqueous slurries containing them. Many such clays are known to those of skill in the art. See, for example, "Applied Minerology" by Ralph E. Grim, McGraw & Hill Book Co., New York (1962); as well as U.S. Pat. Nos. 3,095,339; 2,652,341; and 1,398,201, which are hereby incorporated by reference. Typically, montmorillonite-type clays are useful. Among the montmorillonite-type clays that have found use in the compositions of this invention are bentonite, hectorite and mixtures thereof.

An important component of the compositions of the present invention is a clay flocculating agent, (C), which interacts with the clay in such a fashion as to promote its ability to thicken aqueous slurry. These flocculating agents also act as film stabilizers to stabilize the films formed by removal of water from the disperse composition. Such flocculating agents are generally polyvalent metal salts of metals such as copper, aluminum and the like and are derived from sulfuric, chromic, formic, acetic acid and mixtures of such acids. A suitable description of useful flocculating agents is found on page 396 of McBain's "Colloid Science" published by Heath in 1950. Copper salts are particularly useful flocculating agents and a typical useful copper salt is cupric sulfate. Usually the use of a montmorillonite-type clay as described above in conjunction with a clay flocculating agent results in an aqueous disperse composition which is thixotropic. As known to those in the art, this thixotropic property is desirable when the compositions are used in certain coating applications.

The compositions of the present invention can also include one or more supplemental additives or adjuvants. Such supplemental additives inhibit corrosion of metal and provide freeze/thaw stability under conditions of changing temperatures, etc. Buffers which aid in maintaining the pH of the whole aqueous disperse composition, and particularly the slurry which serves as its external phase, are in the desired range of about 6 to about 9.

The compositions of this invention can include one or more viscosity modifying agents. It is contemplated that a composition may contain a viscosity increasing or viscosity reducing agent. Each may be added at different stages in the production of the composition. For example, it may be desirable to reduce the composition's viscosity while it is being made and then thicken it after it has been formulated. Such techniques are known to those skilled in the art. Among the useful viscosity reducing agents (also known as fluidizers) are the dispersing media described supra, such as inert liquid organic solvent/diluents. Viscosity increasing composition that can be used include fillers such as talc, silica, calcium carbonate and the like for purposes well known to those of skill in the art. Naturally, mixtures of various viscosity modifying agents can be used.

A generally desirable supplemental additive for the compositions of this invention (when they are to be used in coating ferrous material) is a flash antirust agent. Such agent prevents rusting of metal surfaces immediately upon coating with the aqueous disperse composition. While the films formed by water removal from the aqueous disperse compositions of the present invention serve to prevent corrosion of such surfaces once they are formed, flash antirust agents are used in preventing rusting before the films have had a chance to form. A typical flash antirust agent is a phosphoric acid ester neutralized with tetraethylene pentamine. Such materials are well known to those of skill in the art.

Typical buffers used in the compositions of this invention include potassium dichromate/acetic acid and potassium dichromate/phosphoric acid combinations. Acetic acid can also serve as a viscosity thinning agent. The combination of phosphoric acid-based flash antirust agent and dichromate/acetic acid buffer or dichromate/phosphoric acid systems has also been found to give desirable freeze/thaw stability to the aqueous disperse compositions of this invention.

The aqueous disperse compositions of the present invention generally contain about 5 to about 50, typically about 10 to about 40, weight percent of the total disperse composition of (A), the afore-described film-forming material; about 1 to about 10, typically about 2 to about 6, weight percent of the disperse composition of (B-2), the aforedescribed clay on a non-hydrated basis. The flocculating agent (C) is present in an amount of about 1 to about 40, typically about 2 to about 25, percent by weight of the amount of clay (B-2) present. The supplemental additives or adjuvants when used are used in their normal conventional concentrations such as, for example, about 1 to about 15 percent supplemental corrosion inhibitor, about 1 to about 10 percent flash antirust agent, about 0.01 to about 1 percent buffer system and about 0.1 to about 10 percent viscosity modifier. Since the composition is aqueous it contains water; usually it contains at least about 10 percent water, often about 25 percent water. All the percentages just recited are weight percents of the total disperse composition.

Generally the aqueous disperse composition of the present invention are made by combining the oleaginous film-forming material (A) and the clay slurry (B-1) containing the clay (B-2) and the flocculating agent (C). In these aqueous disperse compositions (A) comprises the internal phase and the clay slurry (B-1) the external phase. Care is taken to adjust the pH of the composition within the desired range.

A typical disperse aqueous composition can be made by the method which comprises the steps of:

(I) hydrating a thickening amount of at least one clay (B-2) to form an aqueous clay slurry (B-1);

(II) optionally, treating the aqueous clay slurry (B-1) with any desired supplemental additives selected from the group consisting of inhibitors of corrosion of metal, buffers, freeze/thaw stabilizers and viscosity modifying agents to form an augmented aqueous clay slurry (B-3);

(III) treating the aqueous clay slurry (B-1) or augmented aqueous clay slurry (B-3) with at least one flocculating agent (C) to form a treated aqueous clay slurry or treated augmented aqueous clay slurry;

(IV) reacting at least one carboxylic acid (D) with at least one overbased salt of an organic acid (E) which is typically an overbased, non-Newtonian colloidal system comprising (a). solid, metal-containing colloidal particles predispersed in at least one liquid dispersing medium (2) and characterized by an average unit particle size of at last 20 A. and up to about 5000 A., said particles having formed in situ in said disperse composition from metal-containing materials homogeneously dispersed in a single phase Newtonian overbased material characterized by a metal ratio of at least 1.1;

(b). as an essential third component, at least one organic compound which is soluble in said dispersing medium (2), the molecules of said organic compound being characterized by a hydrophobic portion and at least one polar substituent to form a film-forming oleaginous material (A), (V) optionally fluidizing, as desired, the oleaginous material (A) to form a fluidized material (F);

(VI) optionally adding at least one resin to the aqueous clay slurry (B-1) and/or the film-forming oleaginous material (A) or fluidized material (F); and (VII) combining the film-forming oleaginous material (A) or fluidized material (F) with the aqueous clay slurry (B-1) to form a dispersed composition having the oleaginous material (A) or fluidized material (F) comprising the internal phase and the aqueous clay slurry (B-1) comprising the external phase.

Usually the hydrating and treatment steps are carried out at temperatures in the range of about 15° to about 85° C.; typically, temperatures of about 70° to about 80° C. are used. The reaction of the carboxylic acid (D) with the overbased non-Newtonian collidal system (E)

is usually carried out at temperatures ranging from about 20° to about 120° C. The optional fluidizing step, if it is desired to further reduce the composition's viscosity below that exhibited by the material (A) itself, is carried out at temperatures which fluidize the oleaginous film-forming material and usually fall in the range of about 20° to about 150° C. The optional step of adding at least one resin is carried out within the same temperature range. The combination of the oleaginous film-forming material (A) with the aqueous clay slurry (B-1) is generally carried out at a temperature range of about 15° to about 75° C. Mixing by agitation or stirring usually accompanies each of the steps in the method.

Generally each of the above steps can be carried out at about 0.15 to about 24 hours individually. In certain instances, the hydration step (I) and the combining step (VII) are conveniently carried out for periods of about 2 to about 18 hours each.

As noted above, the method for preparing the aqueous disperse compositions of this invention can optionally include the step of adding at least one resin to the aqueous clay slurry and/or the oleaginous film-forming materials. Among the useful resins are commercially available polymers such as polyethylene, ethylene/propylene copolymer, vinyl acetate, polyvinyl chloride, polybutadiene and the like. Hydrocarbon resins, typically synthetic waxes, are paricularly useful in making rust-proofing coatings. Microcrystalline waxes can also be used.

The resin, whatever its specific nature, functions to aid in the formation of coherent films and/or in providing the film coating produced from the compositions of this inventin by removal of water with desired properties such as adhesiveness, corrosion inhibition, heat stability andthe like.

It is a feature of this invention that the disperse compositions are capable of irreversibly forming coherent films. This means that as water is removed from the composition (through, for example, drying of a coating) a coherent film is irreversibly formed. Once the film has formed by removal of a substantial portion of water, it is not possible to reverse its formation by the addition of water to reform the original disperse composition.

The aqueous disperse compositions of this invention are useful in forming corrosion resistant and inhibiting coatings or films for metal surfaces such as surfaces of ferrous metals, galvanized metal, aluminum, or magnesium, where their irreversible capability is of significant utility. They are especially useful for internally rust proofing and undercoating automotive bodies and the like. They may be employed in these applications alone or in combinations with other known corrosion resistant materials such as aforedescribed supplemental additives and adjuvants. Other known adjuvants for such corrosion inhibiting coatings such as the resins discussed above and many types of petroleum and synthetic waxes may also be used with them. These materials can be incorporated in varying amounts in the aqueous disperse compositions but generally they comprise minor amounts of the composition; typically, about 0.5 to about 5 percent by weight. U.S. Pat. Nos. 3,453,124 and 3,671,072 are incorporated by reference herein for their disclosures of basic compositions and adjuvants which are useful in combination with the aqueous disperse composition of the present invention.

When used for corrosion inhibiting purposes, the aqueous disperse compositions of this invention are generally applied to the surface to be protected and then a substantial amount of the water present in the composition removed through evaporation either in ambient or elevated temperature to form an irreversibly coherent film, generally a substantial amount of water is removed to form the film. Usually, this is in the range of about 80 to about 99 percent of the water originally present. These films, as well as articles of manufacture fully or partially coated with such films are also within the scope of the present invention.

When used for corrosion inhibiting purposes, the aqueous disperse compositions of the present invention may be applied to the metal surface by an ordinary method such as brushing, spraying, dip-coating, flow-coating, roller coating and the like. The viscosity of the aqueous disperse composition may be adjusted for the particular method of application selected by adding, if necessary, a substantially inert, normally liquid organic diluent or other viscosity modifying agent as discussed hereinabove. Mechanical shearing techniques can also be used to vary the viscosity of these aqueous compositions since they are thixotropic in nature. This shearing can be accomplished by using agitators or by forcing the composition through pumps (e.g., gear pumps) or devices such as nozzles. Also, the amount of water present in the aqueous disperse composition may be adjusted to give the desired viscosity. The coated metal surfaces can then be dried by exposure to ambient air or by baking. The film thickness produced is not critical, although coatings of about 50 to about 2,000 milligrams per square foot of coated surface is generally sufficient to provide adequate corrosion protection. Heavier coatings can be used if desired, particularly if the metal article is to be subjected to severe corrosion enhancing conditions, abrasion and/or to be stored for long periods of time.

The following non-limiting examples illustrate the practice of the invention and include the presently known best mode of practicing the invention. All temperatures are in degrees Celcius and all percentages and parts are by weight unless it is specifically noted to the contrary (as they are throughout the rest of the specification and appended claims).

EXAMPLE 1

A hydrated clay slurry is prepared by the incremental addition of 240 parts of Bentonite 200, a commercially available clay from Barroid Division of N. L. Industries, to 3,750 parts of water at ambient temperatures while mixing with a Cowles type mixer. The mixing is continued until the slurry is smooth and no agglomerations are noticeable. The slurry is filtered through a 60-mesh screen and the clay is allowed to further hydrate overnight.

EXAMPLE 2

The procedure of Example 1 is repeated using 651 parts of Bentonite 200 clay and 7,550 parts of water.

EXAMPLE 3

A film-forming material is prepared by slow addition at 77° C. of 144 parts of a 50/50 by weight mixture of isopropyl alcohol and water to a mixture of 821 parts of a polypropenyl ($\overline{M}n=1,000$) substituted succinic anhydride and 2,860 parts of an overbased, non-Newtonian colloidal disperse system made by gelling in the presence of a water/alcohol mixture an overbased, carbonated calcium petroleum sulfonate wherein the free sulfonic acid has an approximate molecular weight of 430.

The overbased sulfonate has a metal ratio of 12 and a mineral oil content of 50%. The overbased calcium petroleum sulfonate itself is made according to the procedure described in U.S. Pat. No. 3,350,308. The gelling procedure is that described in U.S. Pat. No. 3,492,231. The reaction mixture is heated at 77° C. for 2.5 hours under nitrogen and then stripped at 150° C. under nitrogen. The residue is the desired film-forming material.

EXAMPLE 4

An oleaginous film-forming material is prepared by slow addition, at 77° C., of 452 parts of water and 230 parts isopropyl alcohol, to a mixture of 5,000 parts of the overbased, non-Newtonian colloidal disperse system described in Example 3 and 2,145 parts of an oxidized petrolatum fraction available from Ashland Oil Company and known as Tectyl 3050. This oxidized petrolatum has an acid number of 57 measured by ASTM D-664. The reaction mixture is heated to 77° C. for 2.5 hours under nitrogen and then stripped at 150° C. under nitrogen. The residue is the film-forming material.

EXAMPLE 5

A film-forming material is prepared by the careful and slow addition of 144 parts of a 50/50 by weight mixture of isopropyl alcohol and water to a mixture of 2,176 parts of the overbased, non-Newtonian colloidal disperse system described in Example 3, 700 parts of the oxidized petrolatum fraction described in Example 4, and 233 parts of a polypropenyl ($\overline{M}n=1,000$) substituted succinic anhydride at 77° C. The reaction mixture is heated at 77° C. for 2.5 hours under nitrogen and then stripeed at 150° C. under nitrogen. The residue is the desired product.

EXAMPLE 6

A treated clay slurry is prepared by the addition 30.4 parts of a buffer solution made up of 8% potassium dichromate, 8% glacial acetic acid and 84% water; an additional 9.6 parts of glacial acetic acid; and 67.2 parts of a 6.4% aqueous cupric sulfate solution to 10,368 parts of a hydrated clay slurry prepared as described in Example 1 at 60° C.

EXAMPLE 7

A treated clay slurry is prepared by the addition of 20 parts of a buffer solution made up of 8% potassium dichromate, 8% glacial acetic acid and 84% water; an additional 6 parts of glacial acetic; and 45 parts of a 6.4% aqueous cupric sulfate solution to 5,192 parts of a hydrated clay slurry prepared as described in Example 2 at 60° C.

EXAMPLE 8

To 10,475 parts of the treated clay slurry prepared as described in Example 6, is slowly added 4,803 parts of a film-forming material prepared as described in Example 3 which has been preheated to 99° C. The mixture is stirred for 0.5 hour to assure homogenity of the emulsion. At room temperature, an addition of 250 parts of water is made to replenish evaporation losses. A rust inhibitor (394 parts), the neutralization product of one part of a phosphate ester of an ethoxylated linear alcohol commercially available from G. A. F. Corporation as ANTARA LK-500 and 2 parts of triethanolamine, is then added to the emulsion. Aqua-100 (78 parts), a black pigment dispersion from Borden Chemical is then added to the emulsion. After mixing for 5 minutes; a filler (40 parts), Cab-O-Sil, a microscopic fire-dry, fumed silica, available from Cabot Corporation is added, followed by slow mixing to deaerate the emulsion.

EXAMPLE 9

To 5,263 parts of the treated clay slurry prepared as described in Example 7 is slowly added 3,210 parts of film-forming material prepared as described in Example 3 which has been preheated to 99° C. The mixture is stirred for 0.5 hours to assure homogenity of the emulsion. At room temperature, an addition of 113 parts of water is made to replenish evaporation losses. A rust inhibitor (320 parts) as described in Example 8 is then added to the emulsion. Aqua-100 (50 parts), a black pigment dispersion from Borden Chemical is then added to the emulsion. After mixing for 5 minutes; a filler (30 parts), Cab-O-Sil is added, followed by slow mixing to deaerate the emulsion.

EXAMPLE 10

To 6,540 parts of the treated clay slurry prepared as described in Example 6 is slowly added 2,260 parts of a film-forming material prepared as described in Example 4 which has been fluidized by reheating to 99° C. The mixture is stirred for 0.5 hour to assure homogeneity of the emulsion. At room temperature, 270 parts of the rust inhibitor described in Example 8 and 890 parts of a proprietary rust inhibitor composition are added to the emulsion. Aqua-100 (40 parts), a black pigment dispersion from Borden Chemical is then added to the emulsion. After thorough mixing, the emulsion is deaerated by slow mixing.

EXAMPLE 11

To 6,500 parts of the treated clay slurry prepared as described in Example 6 is slowly added 2,320 parts of a film-forming material prepared as described in Example 5 which has been fluidized by reheating to 99° C. The mixture is stirred for 0.5 hour to assure homogeneity of the emulsion. At room temperature, 270 parts of the rust inhibitor described in Example 8 and 900 parts of a proprietary rust inhibitor composition are then added to the emulsion. After thorough mixing, the emulsion is deaerated by slow mixing.

EXAMPLE 12

A clay slurry is prepared from 12.63 parts of the bentonite clay described in Example 1 and 145.28 parts of water in essentially the same manner as described in Example 1.

EXAMPLE 13

The ingredients outlined in the following table are assembled:

TABLE

| | Ingredients | Description | Parts by Weight |
|---|---|---|---|
| 1 | Clay Slurry | Example 12 | 57.44 |
| 2 | 8% Aqueous $K_2Cr_2O_7$ | — | 0.23 |
| 3 | 10% Aqueous $H_3PO_4$ | — | 0.32 |
| 4 | 10% Aqueous $CuSO_4 \cdot 5H_2O$ | — | 0.50 |
| 5 | Film Forming Material | Example 3 | 35.48 |
| 6 | Stoddard Solvent | — | 5.50 |
| 7 | Water | — | 6.75 |
| 8 | Black Pigment | — | 0.58 |

TABLE-continued

| | Ingredients | Description | Parts by Weight |
|---|---|---|---|
| 9 | Rust Inhibitor | Example 8 | 2.9 |
| 10 | Cab-O-Sil | Example 8 | 0.3 |

The hydrated clay slurry is heated to about 65° over a 30-minute period while mixed with a propeller-type steel mixer and water is added to compensate for evaporation losses. Ingredients 2, 3 and 4 are added sequentially. The film-forming material is preheated to 100° and slowly added to the slurry so as to avoid splashing. The slurry is cooled to about 60° and items 6 and 7 are added slowly. The addition of ingredient 6 causes a significant increase in viscosity. Items 8, 9 and 10 are then slowly added sequentially while the mixture is agitated at a temperature of about 38°. The resultant product was a highly thixotropic soft gel-like black material having a solids content of 39% as determined by evaporation of a sample for three hours at 110°.

What is claimed is:

1. An aqueous disperse composition, capable of irreversibly forming a coherent film, comprising (I) an internal phase comprising at least one film-forming, non-asphaltic, oleaginous material (A) and (II) an external phase comprising a clay-thickened water slurry (B-1) having a pH in the range of about 6 to abut 9, said slurry containing, in addition to water and at least one clay (B-2), at least one flocculating agent (C).

2. A composition as claimed in claim 1 wherein the oleaginous material is a carboxylate salt made by reacting at least one carboxylic acid (D), or reactive equivalent thereof, with at least one non-Newtonian system (E) comprising an overbased salt of an organic acid.

3. A composition as claimed in claim 2 wherein the flocculating agent (C) is a water-soluble salt of a heavy metal.

4. A composition as claimed in claim 3 wherein there is also present one or more supplemental additives selected from the group consisting of inhibitors of corrosion of metal, stabilizers of films, buffers, viscosity modifying agents and fillers.

5. A composition as claimed in claim 1 wherein the clay (B-2) is a montmorillonite-type clay.

6. A composition as claimed in claim 2 wherein the clay (B-2) is a montmorillonite-type clay.

7. A composition as claimed in claim 6 wherein the overbased, non-Newtonian system (E) is an alkali metal, alkaline earth metal or alkali/alkaline earth mixed metal overbased salt of at least one organic sulfonic acid, phosphorus acid, carboxylic acid or mixture of two or more of any of these and the aqueous disperse composition, as a whole, is thixotropic.

8. A composition as claimed in claim 1 wherein the carboxylic acid (D) is made by oxidizing a substantially hydrocarbyl material.

9. A composition as claimed in claim 2 wherein the carboxylic acid (D) is made by oxidizing a substantially hydrocarbyl material.

10. A composition as claimed in claim 7 wherein the carboxylic acid (D) is made by oxidizing a substantially hydrocarbyl material.

11. A composition as claimed in claim 1 wherein the carboxylic acid (D) is of the general formula $$R(COOH)_x$$

wherein R is a substantially hydrocarbyl group of about 12 to about 300 carbon atoms derived from polymerization of at least one $C_{2-8}$ olefin and x is 1, 2 or 3.

12. A composition as claimed in claim 2 wherein the carboxylic acid (D) is of the general formula $$R(COOH)_x$$

wherein R is a substantially hydrocarbyl group of about 12 to about 300 carbon atoms derived from polymerization of at least one $C_{2-8}$ olefin and x is 1, 2 or 3.

13. A composition as claimed in claim 7 wherein the carboxylic acid (D) is of the general formula $$R(COOH)_x$$

wherein R is a substantially hydrocarbyl group of about 12 to about 300 carbon atoms derived from polymerization of at least one $C_{2-8}$ olefin and x is 1, 2 or 3.

14. A composition as claimed in claim 4 wherein the clay (B-2) is a montmorillonite-type clay, the flocculating agent (C) is a copper salt and the overbased, non-Newtonian system (E) is an alkali metal, alkaline earth metal or alkali/alkaline earth mixed metal overbased salt of at least one organic sulfonic acid, carboxylic acid or mixture of same and the disperse composition, as a whole, is thixotropic.

15. A composition as claimed in claim 10 wherein the clay (B-2) is bentonite, hectorite or mixtures of same, the flocculating agent (C) is copper sulfate, the overbased, non-Newtonian system (E) is an overbased calcium sulfonate, the carboxylic acid (D) is made by oxidizing a petrolatum and there is also present one or more supplemental additives selected from the group consisting of inhibitors of corrosion of metal, stabilizers of films, buffers, viscosity modifying agents and fillers.

16. A composition as claimed in claim 15 wherein there is present a buffer selected from the group consisting of alkali metal salts of chromic acid, mineral acids, $C_{1-4}$ carboxylic acids and mixtures of same and a flash corrosion inhibitor.

17. A composition as claimed in claim 1 wherein the oleaginous material (A) constitutes about 5 to about 50 weight percent of the disperse composition, the clay (B-2) constitutes about 1 to about 10 weight percent of the disperse composition and the flocculating agent (C) is about 1 to about 40 percent by weight of the clay (B-2) present.

18. A composition as claimed in claim 4 wherein the oleaginous material (A) constitutes about 5 to about 50 weight percent of the disperse composition, the clay (B-2) constitutes about 1 to about 10 weight percent of the disperse composition and the flocculating agent (C) is about 1-40 percent by weight of the clay (B-2) present.

19. A composition as claimed in claim 7 wherein the oleaginous material (A) constitutes about 5 to about 50 weight percent of the disperse composition, the clay (B-2) constitutes about 1 to about 10 weight percent of the disperse composition and the flocculating agent (C) is about 1 to about 40 percent by weight of the clay (B-2) present.

20. A composition as claimed in claim 15 wherein the oleaginous material (A) constitutes about 5 to about 50 weight percent of the disperse composition, the clay (B-2) constitutes about 1 to about 10 weight percent of the disperse composition and the flocculating agent (C)

is about 1 to about 40 percent by weight of the clay (B-2) present.

21. A composition as claimed in claim 2 wherein the overbased salt (E) is a non-Newtonian colloidal disperse system comprising:
  1. solid, metal-containing colloidal particles predispersed in at least one diluent dispersing medium (2) and characterized by an average unit particle size of at least 20 A. and up to about 5,000 A., said particles having been formed in situ in said non-Newtonian colloidal system from metal-containing materials homogeneously dispersed in a single-phase Newtonian overbased material, characterized by a metal ratio of at least 1:1;
  2. as an essential third component, at least one organic compound which is soluble in the dispersing medium (2), the molecules of said organic compound being characterized by a hydrophobic portion and at least one polar substituent.

22. A coherent film formed by removing a substantial proportion of water from the aqueous, disperse composition of claim 1.

23. A coherent film formed by removing a substantial proportion of water from the aqueous disperse composition of claim 2.

24. A coherent film formed by removing a substantial proportion of water from the aqueous disperse composition of claim 4.

25. A coherent film formed by removing a substantial proportion of water from the aqueous disperse composition of claim 6.

26. A coherent film formed by removing a substantial proportion of water from the aqueous disperse composition of claim 9.

27. A coherent film formed by removing a substantial proportion of water from the aqueous disperse composition of claim 11.

28. A coherent film formed by removing a substantial proportion of water from the aqueous disperse composition of claim 14.

29. A coherent film formed by removing a substantial proportion of water from the aqueous disperse composition of claim 16.

30. A coherent film formed by removing a substantial proportion of water from the aqueous disperse composition of claim 20.

31. An article of manufacture having a metal surface susceptible to corrosion, wherein said surface is at least partially coated with the film of claim 22.

32. An article of manufacture having a metal surface susceptible to corrosion wherein said surface is at least partially coated with the film of claim 24.

33. An article of manufacture having a metal surface susceptible to corrosion wherein said surface is at least partially coated with the film of claim 26.

34. An article of manufacture having a metal surface susceptible to corrosion wherein aid surface is at least partially coated with the film of claim 27.

35. An article of manufacture having a metal surface susceptible to corrosion wherein said surface is at least partially coated with the film of claim 29.

36. An article of manufacture having a metal surface susceptible to corrosion wherein said surface is at least partially coated with the film of claim 30.

37. A method of inhibiting corrosion of metal surfaces which comprises applying the aqueous disperse composition of claim 1 to a metal surface and removing substantially all of the water in the composition to produce a coherent film over at least part of the metal surface.

38. A method of inhibiting corrosion of metal surfaces which comprises applying the aqueous disperse composition of claim 2 to the metal surface and removing substantially all of the water in the system to produce a coherent film over at least part of the surface.

39. A method of inhibiting corrosion of metal surfaces which comprises applying the aqueous disperse composition of claim 11 to the metal surface and removing substantially all of the water in the system to produce a coherent film over at least part of the surface.

40. A method of inhibiting corrosion of metal surfaces which comprises applying the aqueous disperse composition of claim 16 to the metal surface and removing substantially all of the water in the system to produce a coherent film over at least part of the surface.

41. A method of inhibiting corrosion of metal surfaces which comprises applying the aqueous disperse composition of claim 20 to the metal surface and removing substantially all of the water in the system to produce a coherent film over at least part of the surface.

42. A method for preparing an aqueous disperse composition, capable of irreversibly forming a coherent film, which comprises the steps of:
  I hydrating a thickening amount of at least one clay (B-2) to form an aqueous slurry (B-1);
  II treating the aqueous surry (B-1) with at least one flocculating agent (C) to form a treated aqueous clay slurry or treated augmented aqueous clay slurry;
  III reacting at least one carboxylic acid (D) with at least one overbased salt of an organic acid (E) to form a film-forming oleaginous material (A); and
  IV combining the oleaginous material with the aqueous clay slurry (B-1) to form a disperse composition having the oleaginous material (A) or material (F) comprising the internal phase and the aqueous clay slurry (B-1) comprising the external phase.

43. A method as claimed in claim 42 wherein the overbased salt (E) is an overbased, non-Newtonian colloidal system comprising
  a. solid, metal-containing colloidal particles predispersed in at least one liquid dispersing medium (2) and characterized by an average unit particle size of at least 20 A. and up to about 5000 A., said particles having formed in situ in said disperse system from metal-containing materials homogeneously dispersed in a single phase Netonian overbased material characterized by a metal ratio of at least 1.1,
  b. as an essential third component, at least one organic compound which is soluble in said dispersing medium (2), the molecules of said organic compound being characterized by a hydrophobic portion and at least one polar substituent.

44. A method as claimed in claim 43 wherein the flocculating agent (C) is selected from the group consisting of water-soluble polyvalent metal salts of sulfuric, chromic, formic, acetic acid, and mixtures of such acids.

45. A method as claimed in claim 44 wherein the clay (B-2) is a montmorillonite-type clay.

46. A method as claimed in claim 45 wherein the overbased, non-Newtonian system (E) is an alkali metal, alkaline earth metal or alkali/alkaline earth mixed metal overbased salt of at least one organic sulfonic acid, carboxylic acid or mixture of same and the disperse composition, as a whole, is thixotropic.

47. A method as claimed in claim 46 wherein the carboxylic acid (D) is made by oxidizing a substantially hydrocarbyl material.

48. A method as claimed in claim 47 wherein the substantially hydrocarbyl material is petrolatum.

49. A method as claimed in claim 46 wherein the carboxylic acid (D) is of the general formula $$R(COOH)_x$$

wherein R is a substantially hydrocarbyl group of about 12 to about 300 carbon atoms derived from polymerization of at least one $C_{2-8}$ olefin and x is 1, 2 or 3.

50. A method as claimed in claim 48 wherein the flocculating agent (C) is a copper salt.

51. A method as claimed in claim 50 wherein the clay (B-2) is bentonite, hectorite or a mixture of same.

52. A method as claimed in claim 51 wherein the oleaginous material (A) is about 5 to about 50 weight percent of the disperse aqueous composition, the clay (B-2) is about 1 to about 10 weight percent of the disperse aqueous composition and the flocculating agent (C) is about 1 to about 40 weight percent of the amount of the clay (B-2).

53. A method as claimed in claim 42 wherein after step (I) the aqueous slurry is treated with at least one supplemental additive selected from the group consisting of inhibitors of corrosion of metal, inert fillers, buffers, film stabilizers, thinning viscosity modifying agents, and thickening modifying agents.

54. A method as claimed in claim 53 wherein after step (III) adding at least one resin to the aqueous clay slurry (B-1), the film-forming oleaginous material (A) or the fluidized material (F).

* * * * *

UNITED STATES PATENT AND TRADEMARK OFFICE
CERTIFICATE OF CORRECTION

PATENT NO. : 4,161,566
DATED : July 17, 1979
INVENTOR(S) : William Albert Higgins It is certified that error appears in the above-identified patent and that said Letters Patent are hereby corrected as shown below:

Column 17, line 28, "abut" should be --about--.

Column 19, line 14, "1:1" should be --1.1--.

Column 19, line 57, "aid" should be --said--.

Column 20, line 50, "Netonian" should be --Newtonian--.

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*